March 10, 1970 J. W. BERRY 3,500,047

SYSTEM FOR ENCODING INFORMATION FOR AUTOMATIC READOUT PRODUCING SYMBOLS HAVING BOTH PHOTOLUMINESCENT MATERIAL AS CODING COMPONENTS AND VISIBLE MATERIAL AND ILLUMINATING WITH BOTH VISIBLE AND ULTRAVIOLET LIGHT

Filed Feb. 9, 1966 2 Sheets-Sheet 1

INVENTOR.
JOHN WILLIAM BERRY
BY
Samuel Branch Walker
ATTORNEY

March 10, 1970 J. W. BERRY 3,500,047

SYSTEM FOR ENCODING INFORMATION FOR AUTOMATIC READOUT PRODUCING SYMBOLS HAVING BOTH PHOTOLUMINESCENT MATERIAL AS CODING COMPONENTS AND VISIBLE MATERIAL AND ILLUMINATING WITH BOTH VISIBLE AND ULTRAVIOLET LIGHT

Filed Feb. 9, 1966 2 Sheets-Sheet 2

INVENTOR.
JOHN WILLIAM BERRY
BY
Samuel Branch Walker
ATTORNEY

United States Patent Office 3,500,047

Patented Mar. 10, 1970

3,500,047

SYSTEM FOR ENCODING INFORMATION FOR AUTOMATIC READOUT PRODUCING SYMBOLS HAVING BOTH PHOTOLUMINESCENT MATERIAL AS CODING COMPONENTS AND VISIBLE MATERIAL AND ILLUMINATING WITH BOTH VISIBLE AND ULTRAVIOLET LIGHT

John William Berry, Stamford, Conn., assignor to American Cyanamid Company, Stamford, Conn., a corporation of Maine Filed Feb. 9, 1966, Ser. No. 526,192

Int. Cl. G01n *21/16, 21/38, 23/00*

U.S. Cl. 250—71 10 Claims

ABSTRACT OF THE DISCLOSURE

A coded ink system in which coding is by the presence or absence of both photoluminescent components which photoluminesce under ultraviolet light and components which selectively reflect in the visible. Readout is effected by illuminating the symbol with both visible and ultraviolet light, either illuminating part of the symbol with one light and part with the other or by sequential illumination first with one light and then the other. The selective reflectance and the photoluminescence is detected by individual detectors corresponding to the luminescence for each component, and detector signals are read out to give an output corresponding to a particular symbol.

RELATED APPLICATIONS

In the co-pending application of Halverson and Freeman, Ser. No. 596,366, filed Oct. 14, 1966, now Patent 3,473,027, Oct. 14, 1969, which is a continuation-in-part of application. Ser. No. 437,866, filed Mar. 8, 1965, now abandoned assigned to the assignee of the present application, there is described a process for encoding and retrieving information by means of so called coded inks, that is to say, inks which have various combinations of components which fluoresce under ultraviolet or other short wave illumination at different wavelengths.

A more sophisticated modification forms the subject matter of the co-pending application of Hirt, Ser. No. 526,062, filed Feb. 9, 1966, now abandoned, and also assigned to the assignee of the present application.

BACKGROUND OF THE INVENTION

In the Freeman and Halverson and Hirt applications referred to above there are used for at least some of the components chelated lanthanide ions which under ultraviolet light of suitable wavelength fluoresce in very narrow bands, because the chelated ions are excited by the ultraviolet to a particular metastable state, and in falling back to a lower energy level emit fluorescent radiation of a narrow wavelength band depending on the particular lanthanide ion. Coding is preferably by the presence or absence of the particular components, and this permits a number of symbols equal to $2^n-1$, where $n$ is the number of components. For example, four components permit 15 different symbols, which is sufficient to use the inks for encoding all ten digits for the encoding and decoding of numbers. The Freeman and Halverson application has the great advantage that the different symbols depend in no way on the shape of the symbol, which can be a dot, rectangle, or any other shape, and does not require to be in the shape of particular digits, as is needed in other systems, for example those using magnetic inks. As a result, the accuracy of the coding and retrieval of information is in no way adversely affected by change in the shape of coded symbols. For example, in a typical case, where the code is for an account number on bank checks, if the bank check is carelessly torn off and the shape of one or more digits is altered, this results in false readout, for example with magnetic ink digits, but in no way affects the accuracy of readout of coded inks according to the Freeman and Halverson application.

The number of different symbols possible depends on the number of distinct photoluminescent components which are available. The number is somewhat limited by the number of lanthanide ions which can be made into chelates economically. There is described in the application referred to the use of more than one level of compound, for instance two levels as well as absence, which increases considerably the number of symbols possible but only at a price of reduced signal to noise ratio, using this term in its broader sense as desired identification over spurious signals produced. The present invention has for one of its objects an increase in the number of useful components without requiring multiple levels, although, as will be clear from a further consideration of the more detailed description, it can also be used with such operations.

SUMMARY OF THE INVENTION

Essentially, the present invention combines components which have color in the visible spectrum with the photoluminescent materials. This permits multiplying the number of symbols possible with any given number of fluorescent components by a factor of at least seven, and under certain conditions eight. At the same time, all of the advantages of coded ink encoding and information retrieval are retained except for a minor disadvantage in certain situations. The photoluminescent materials are essentially colorless, and therefore when they are the only components used in a coded ink system, the presence of the symbols may be secret. In other words, its does not appear from an examination under visible light but only when illuminated with ultraviolet light or other suitable shortwave radiation, depending on the nature of the fluorescent material. In the majority of coded ink uses it is unobjectionable if under observation by visible light it becomes apparent that there is some symbol present.

The operation of the present invention will first be discussed in somewhat more general terms. Let us assume the availability or use for coded ink purposes of four photoluminescent components. As is pointed out above, this permits fifteen different symbols. Now, by using three visible light detectors, for example red, green and blue, illumination by white visual light permits additional information. A black pigment or color will reflect no red, green or blue. A white color will indicate the presence of all three. A red color would indicate the presence of red, a green color of green, and a blue color of blue, whereas a yellow color would show the presence of both red and green, and a purple color the presence of both blue and red. In each case the appropriate sensor receives the signal, none of the three in the case of black, all three in the case of white, and the particular ones in the case of the colors. This adds up to seven possibilities under visual light, which can be combined wtih each of the symbols shown by photoluminescent material, thus multiplying the number of symbols possible by seven. In other words, instead of fifteen symbols there would be 105. Theoretically it is also possible to have a cyan color, which would reflect both blue and green, and in such a case there would be eight possibilities with the three visible light sensors, and the number of symbols would be 120. With larger numbers of photoluminescent materials still greater numbers of symbols are possible, for example with ten photoluminescent components either 7161 or 8184 respectively.

The present invention requires for its practical operation some further limitations, as it is not practical to illuminate the same symbol continuously with both ultraviolet and visible light, because of the possibility of overlapping response from the different radiation detectors. This requires some means of separation, one of which can be a timing or time sharing device in which the symbol is first illuminated with visible light and then with ultraviolet light with suitable timed connection of the two types of radiation detectors synchronously. This is a simple method, as synchronously sequential response circuits for the electrical output of the radiation detectors are standard items in electronics. Another method is to separate the two symbols spatially so that a part of the symbol only containing the visible light components is illuminated by visible light and a second portion of the symbol containing photoluminescent components is illuminated by ultraviolet light. It is not essential in this latter mode that the signal be in two portions, although this gives the greatest reliability, because none of the components for the red, green and blue sensors reflect any of these colors when illuminated by ultraviolet light.

The use of time sharing or space separation are two typical methods of preventing spurious response, but the invention is not limited thereto in its broadest aspects.

DESCRIPTION OF THE PREFERRED EMBODIMENTS

For simplicity the drawings will be described in conjunction with a system using four photoluminescent components labelled A, B, C and D and seven visible components, black, blue, green, red, yellow, purple and white together with three sensors for red, green and blue respectively, which are labelled R, G, and Bl. The invention is in no way concerned with the particular design of the radiation detectors, which may be provided with filters passing the desired narrow wavelength bands or dispersing means for the two types of detectors, such as prisms which separate the different wavelength bands spatially.

Figure 1:
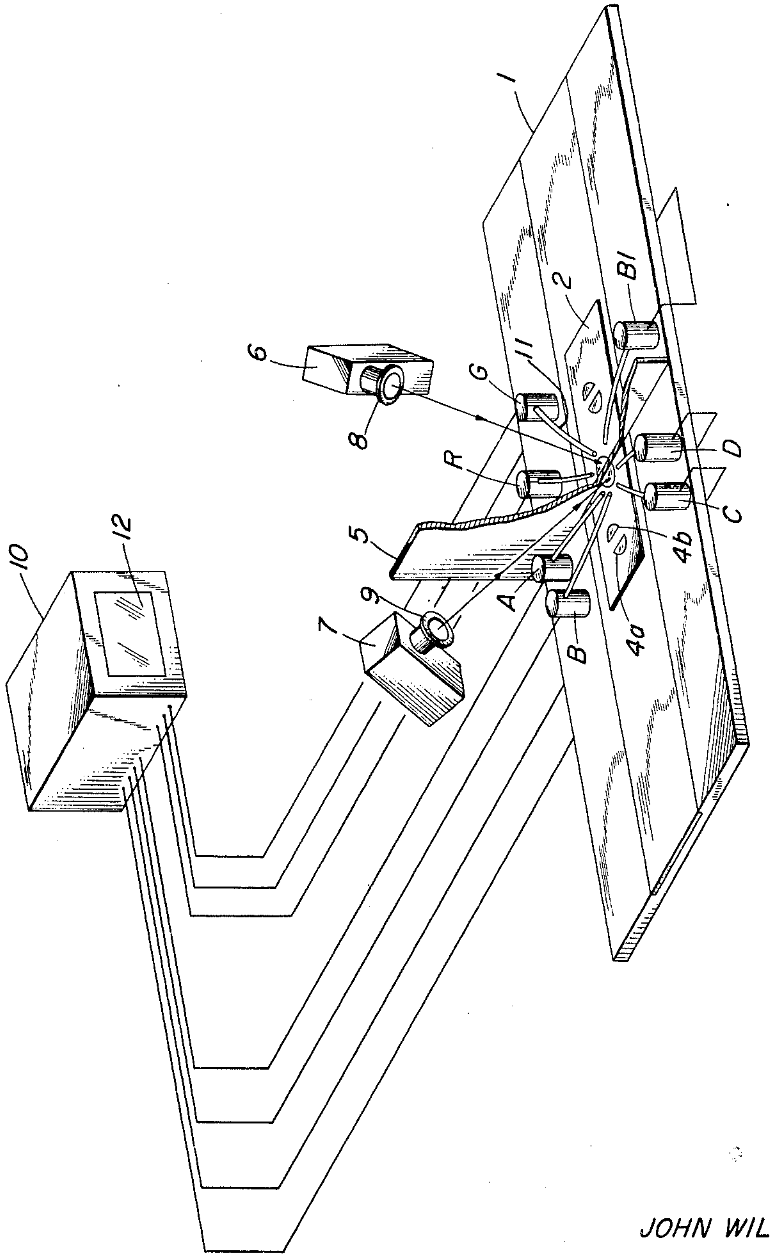
FIG. 1 is a diagrammatic representation of the space separated modification.

In FIG. 1 there is a substrate or table 1 over which a card 2, bank check or other surface on which the coded symbols are applied, is moved intermittently so that the two portions of a symbol *4a* and *4b*, the former containing only photoluminescent components and the latter only visible components, are moved to successive positions where the symbol is under a sharp dividing baffle 5. A visible light lamp 6 and an ultraviolet source, such as for example a mercury arc lamp with suitable filter 7, illuminate the respective portions of the symbol through periodically operating shutters 8 and 9. When the symbol is positioned as shown in the drawing, the shutters are opened and the portion *4a* is continuously illuminated with the ultraviolet light, for example the 3130 A. mercury line, and the white visible light from the lamp 6 illuminates *4b*. The ultraviolet light causes any photoluminescent components to fluoresce if they are present and each is detected by its own detector A, B, C and D. Similarly, the seven visible color components in the portion of the symbol *4b* reflect and energize one or more of the detectors R, G and Bl or none in the case of black. The detectors are shown as receiving light, reflected in the case of the visible and fluorescent in the case of the lanthanide ion chelates, through glass fiber optics tubes 11 of standard design, the bundle of glass fibers being protected with an opaque external cover, as is customary in such glass fiber light pipes. The detectors themselves use photomultiplier tubes of conventional design with suitable filters, for example interference filters, of the appropriate narrow band widths for the particular radiation to be received. As the photomultipliers and filters are of conventional design, they are not shown, the detector housing thus representing a purely diagrammatic showing.

The signals from the various detectors are led into an electronic readout 10, which can be of conventional design. The connecting wires are not numbered and are merely a diagrammatic illustration of electrical connection between the detectors and the readout. The readout, preferably, is also provided with suitable circuits for actuating the shutters 8 and 9. The lights 6 and 7 being of conventional design are shown without their feed wires in order to simplify the drawing. The readout gives a response depending on which of the detectors are energized and may have a window 12 on which the particular symbol may appear by conventional readout designs. The use of shutters is a simple form of preventing signals while the card 2 is moving from one symbol to another. This is only one illustration, as the same effect can be obtained by cutting off signals from the detectors in the circuits of the readout 10. The use of shutters, however, is a convenient and simple method of preventing unwanted signals during movement of the card 2 and for many purposes is preferred.

The object, which will be described as a card for simplicity, is moved intermittently, the shutters 8 and 9 being closed during movement, to a position locating the next symbol under the baffle 5. Movement also, as is customary with digital readout, clears the readout 10 so that it is ready to respond to the next symbol. The shutters open, the symbol is irradiated with visible and ultraviolet light as described above, and the second digit or component part of the message transmitted by the symbols is then read out.

FIG. 1 shows symbols which are broken up into two separate areas, one having only visible components, the other only photoluminescent components. This gives the sharpest and most clear-cut separation. However, it is possible for the symbol to have all of the components in it together but of sufficient width or other dimension so that part of it is on one side of the baffle 5 and part on the other.

Figure 2:
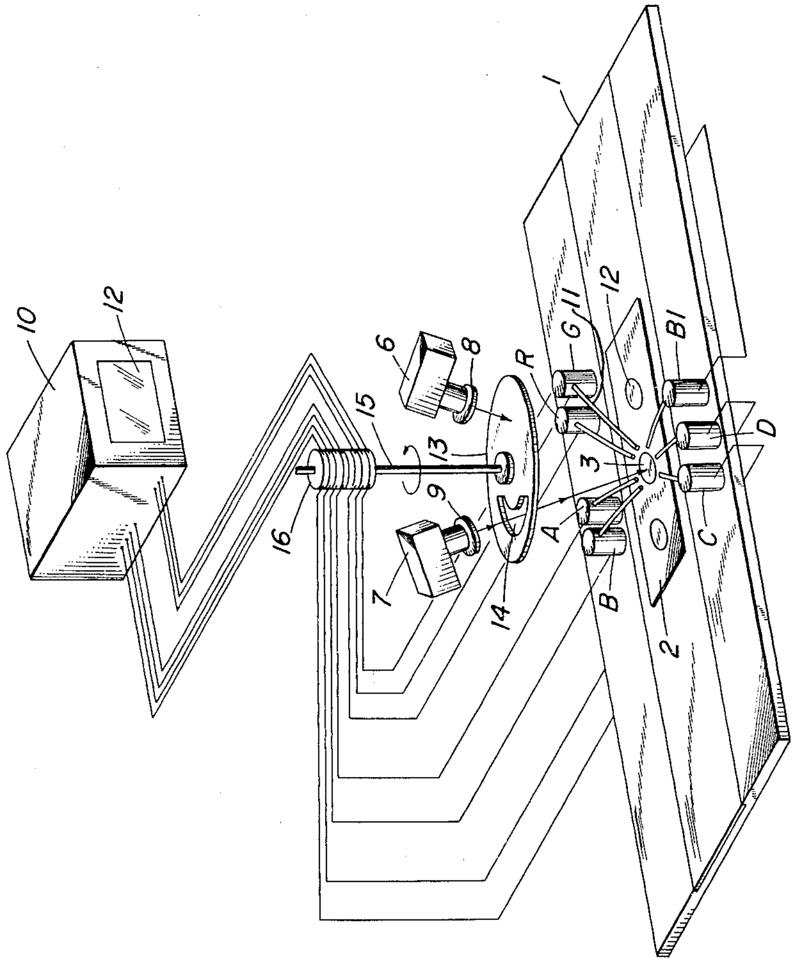
FIG. 2 is a diagrammatic representation of the time sharing modification.

FIG. 2 illustrates the use of a time sharing modification, the same elements bearing the same reference numerals as in FIG. 1. In this case the substrate, the moving card 2, carries only a single symbol 3. Light from the two lights 6 and 7 is alternately flashed onto the symbol by the rotating shutter disc 13 which is provided with an aperture 14. This disc turns on a shaft 15 rotated by a motor (not shown). The shaft also contains a commutator 16 which sends pulse commands to the readout circuit 10 which has to read out after the receipt of the necessary signals both from the detectors A, B, C and D and R, G and Bl. The shutters 8 and 9 can be eliminated if desired, and movement of the card 2 can either be continuous or intermittent, for example during a portion of the rotation of the disc 13 when neither light goes through. As all of the operations except the mechanical movement of the card 2 are extremely fast, very high speed reading is possible, at least as high as in FIG. 1 where the mechanical movements of the shutters 8 and 9 as well as the intermittent movement of the card 2 set certain limits on practical reading speed. The rotating shutter 13 can be readily designed to operate at considerably higher speeds.

In FIG. 2 the lights 6 and 7 can also be actuated intermittently instead of using a rotating shutter, and of course in synchronism with the switching of the particular circuits to the radiation detectors. The elimination of another moving mechanical part is offset by the additional wear and tear on the lights, and the particular means for producing sequential illumination may be chosen in accordance with all of the factors of a particular operation, thus adding a desirable practical flexibility to the invention.

The description of the drawings shows the operation of various modifications of the present invention without describing specific photoluminescent materials A, B, C and D. The invention is of course not limited either to the number of photoluminescent components or to their exact chemical nature. A typical example of four photoluminecent components is represented by A being 4,5-diphenylimidazolone-2. Components B, C and D can be chelates of europium, terbium and samarium respectively. Radiation detector A is sensitive to blue light, which is the fluorescence of 4,5-diphenylimidazolone-2 when activated by the 3130 A. line of the mercury vapor light 7. This same wavelength is also effective in causing the three lanthanide ion chelates to fluoresce. There is a further advantage over some other ordinary fluoresecnt material that there is a minimum confusion with optical brighteners often put in paper and other materials which only fluoresce significantly under longer wave ultraviolet, such as the 3650 A. line of the mercury lamp.

In the example given the fluorescence of the europium is in the deep red and of terbium in the green, while of course the diphenylimidazolone fluoresces in the blue. Since these colors are suitable also for the red, green and blue detectors for visible light operation, it is possible to use the same detectors for both purposes, thus requiring only four detectors instead of a total of seven. No problem is encountered with the narrow band fluorescence of the europium and terbium chelates, and the same narrow cutting interference filters may be used. There is plenty of energy available as the reflection of pigments or dyes taken with the quite strong visible light lamp permits adequate signal levels. Saving in the number of detectors is offset, but only slightly, by the necessity of providing some additional switching circuits in the readout 10, because obviously a particular detector, say the red detector, must be switched into different circuits when it is responding to fluorescence under ultraviolet light than when it is responding to visible light. These circuits, however, are simple, conventional, and thoroughly reliable, especially when modern solid state electronics are utilized, and so for many purposes the saving in the number of detectors is distinctly worthwhile.

It should be noted that while the fluorescence from the lanthanide ion chelates is extremely narrow band and sharp, the selective reflectance of colors is often less sharp; for example many good red pigments reflect a little in the blue. This, however, presents no problem because, as has been pointed out above, there is a great deal of radiation energy available in the visible light phase of the present invention, and so when signals are coming from the visible light detectors the response of the readout system can be reduced in sensitivity sufficiently so that the small amount of reflectance outside of the range of the particular detector does not actuate the readout. Such level setting involves the most elementary of electronics and presents no problem at all. In the case where fluorescent detectors for europium, terbium and diphenylimidazolone are used also for the three visible light detectors, when illumination is by visible light and the signals from the detectors are switched to the visible light circuits of the readout 10, these circuits should of course be provided with the necessary attenuation or level setting, because in the fluorescence detection the amount of energy is considerably less, and therefore, ordinarily there should be no attenuation of signals coming from the detectors when they are detecting fluorescence.

It is an advantage of the present invention that there is no critical level setting required so long as the levels are set in the visible so that reflection outside the particular detectors band does not actuate the readout. The actuation occurs with any signals above this minimum, and therefore differences in efficiency of reflection of different pigments or dyes do not present any problem, because the readout of course responds to signals which indicate that a particular component is either present or absent, and so the high signal to noise ratio which is characteristic of this more digital type of response is fully retained. Reference has been made above to the desirability for certain uses, such as for example bank check account numbers, of being able to read symbols by visible light without using ultraviolet light or combined ultraviolet and visible light according to the present invention. In the present invention each symbol is colored and hence, if shaped, is directly readable. The fact that the present invention can be used with shaped symbols which are visibly readable as well as readable from the code of the ink adds a desirable additional flexibility although it is not a characteristic which is unique with the present invention, as the same additional readout possibility can be used with the basic Freeman and Halverson system referred to above. It is however an advantage of the invention that its important new possibilities can be achieved without sacrificing any of the possibilities available with the simpler systems. In other words, the present invention does not represent a compromise in the respect of symbols which can be detected visibly.

Throughout the specification and claims reference is made repeatedly to printing coded symbols. This language is used in its broader sense because, of course, it is immaterial whether a symbol is literally printed by a printing press or is typewritten or otherwise produced.

I claim:

1. In a process of coded ink symbol printing and information retrieval in which the coded ink contains at least one photoluminescent material fluorescing under ultraviolet illumination and retrieval by a plurality of radiation detectors, each one responding only to the wavelength band of fluorescence of one of the photoluminescent materials, the improvement which comprises printing symbols additionally containing at least somewhere in the symbol area at least one non-fluorescent substance having reflecting characteristics for red, green and blue light characterized by reflecting none, all, one or any two of the said colors and information retrieval by three radiation detectors responding respectively to red, green and blue lights, illuminating the portion of the symbol containing the reflecting substances by white light and separating symbols' signals from the red, green and blue, and illuminating the portion of the symbol containing photoluminescent components with ultraviolet light and separating symbol signals from the fluorescent detectors and perceiving and exhibiting a result determined by the presence or absence of the photoluminescent and visible light reflecting components corresponding to the code of the symbol represented.

2. A process according to claim 1 in which the signals from the two kinds of detectors are separated by time sharing and the symbol is sequentially illuminated by ultraviolet and white light.

3. A process according to claim 1 in which a portion of the area of the symbol only is illuminated with white light and reflects into the red, green and blue radiation detectors and another separate portion is illuminated only by ultraviolet light and deflects into the detectors for fluorescent light from the photoluminescent components.

4. A process according to claim 3 in which the object containing a message in the coded symbols is intermittently moved to positions where one portion of one symbol is illuminated by white light and another portion by ultraviolet light, and illumination is cut off during intermittent motion from one symbol to another.

5. A process according to claim 1 in which at least one of the photoluminescent components is a chelate of a lanthanide ion.

6. A process according to claim 2 in which at least one of the photoluminescent components is a chelate of a lanthanide ion.

7. A process according to claim 3 in which at least one of the photoluminescent components is a chelate of a lanthanide ion.

8. A process according to claim 2 in which at least one of the detectors for photoluminescent components also serves in its turn as one of the visible light detectors.

9. A process according to claim 8 in which three of the fluorescent detectors are used as the visible light detectors.

10. A process according to claim 9 in which the red detector detects the fluorescent band of a europium chelate and the green detector detects a fluorescent band from a terbium chelate.

References Cited

UNITED STATES PATENTS

| | | | |
|---|---|---|---|
| 3,196,393 | 7/1965 | Siegemund | 340—146.3 |
| 2,975,966 | 3/1961 | Howard | 250—71 |
| 2,888,570 | 5/1959 | Toulmin | 250—71 |
| 3,105,908 | 10/1963 | Burkhardt et al. | 250—71 |
| 3,211,908 | 10/1965 | Leibowitz. | |
| 3,225,307 | 12/1965 | Weissman | 252—301.3 |

ARCHIE R. BORCHELT, Primary Examiner

MORTON J. FROME, Assistant Examiner

U.S. Cl. X.R.

235—61.115; 250—219, 226; 252—301.3